(12) United States Patent
Downum et al.

(10) Patent No.: US 8,229,912 B2
(45) Date of Patent: Jul. 24, 2012

(54) ENHANCED SEARCH ENGINE

(75) Inventors: James E Downum, Castle Rock, CO (US); Leo J. LaCascia, Jr., Highlands Ranch, CO (US)

(73) Assignee: Mentis Technology, LLC, Denver, CO (US)

( * ) Notice: Subject to any disclaimer, the term of this patent is extended or adjusted under 35 U.S.C. 154(b) by 120 days.

(21) Appl. No.: 12/774,564

(22) Filed: May 5, 2010

(65) Prior Publication Data
US 2010/0287150 A1 Nov. 11, 2010

Related U.S. Application Data

(60) Provisional application No. 61/176,022, filed on May 6, 2009.

(51) Int. Cl.
*G06F 17/00* (2006.01)

(52) U.S. Cl. ........ 707/706; 707/802; 707/822; 707/828; 707/791; 707/722

(58) Field of Classification Search ........... 707/600–899
See application file for complete search history.

(56) References Cited

U.S. PATENT DOCUMENTS

2006/0061796 A1\* 3/2006 O'Sullivan ................... 358/1.14
\* cited by examiner

*Primary Examiner* — Isaac M Woo
(74) *Attorney, Agent, or Firm* — Sheridan Ross P.C.

(57) ABSTRACT

The present invention provides methods, devices, and systems for displaying results of a search engine query in a graphic, rather than, or in addition to, textual format. The search results are provided to a user such that the user is able to see the context of the words and phrases in the format of the original source document. Presentation of graphic fragments from the source document help to improve a user's ability to select among documents provided in the search results more efficiently.

17 Claims, 4 Drawing Sheets

ENHANCED SEARCH ENGINE

CROSS REFERENCE TO RELATED APPLICATIONS

This Application claims the benefit of U.S. Provisional Application No. 61/176,022, filed May 6, 2009, the entire disclosure of which is hereby incorporated herein by reference.

FIELD OF THE INVENTION

The invention relates generally to systems and methods for searching and retrieving electronic documents and more particularly to returning relevant image portions thereof to a user.

BACKGROUND

Search engines and search engine technology have developed a great deal over the past twenty years, particularly with the proliferation of the Internet. Search engines are also widely used in enterprise document management systems whereby a user is allowed to search internal source documents of an enterprise rather than search all source documents available on the Internet. There are typically three aspects to the software in a search engine. The first is the search engine's ability to obtain and analyze source data which will be searched. The second is the search engine's ability to perform the search based on query parameters provided by an end user and identify relevant results for the user. The third is the search engine's ability to present the relevant results from the query to the user.

One shortcoming of current search engines is that the initial results provided back to the user are not particularly useful for certain types of source documents. For example, non-text-based source documents such as image files and scanned copies of original documents (e.g., PDF documents, TIF documents, etc.) are not easily reviewable by a user when they are provided in a list of possibly relevant source documents in the initial set of search results. More particularly, while some search engines provide the ability to return some portion of text that was found to be relevant within the source document, those text portions are usually out of context, thereby making them less useful.

Another shortcoming of current search engines is that the initial results are displayed in a textual format. This usually means that important visual cues in the source document may be lost, thereby making the initial results less useful to a user.

SUMMARY

Embodiments of the present invention are adapted to retrieve relevant search results and present the search results to a user such that the user is allowed to easily see the context of words, graphics, phrases, and the like in the format of the original source document. More specifically, embodiments of the present invention are adapted to retrieve image results for a relevant portion of a source document, the source document having been identified as a relevant source document based on the user's query parameters, and provide that image of the relevant portion of the source document to the user in the initial search results. This allows the user to view a list of source documents that have been identified as relevant in addition to viewing an image of the relevant portion of at least one of those source documents, thereby enabling the user to quickly identify the desirable source document in the search results list. By providing an image of the relevant portion of a source document, the user is able to see each search result in the list of search results in its original context (i.e., as the original source document appears and not just the textual representation of the original source document).

In accordance with at least some embodiments of the present invention, a method is provided that generally comprises:

receiving a search query comprising at least one query term;

identifying a plurality of source documents based on the supplied term or terms;

identifying a relevant portion of at least one source document in the plurality of source documents;

identifying a view window appropriate to depict the relevant portion of those source documents, wherein the image size of the view window may be smaller than the image size of one or more of the source documents;

rendering a search results image for the relevant portion of the at least one source document, the search results image having boundaries corresponding to the view window; and providing search results, the search results including the search results image.

It is one aspect of the present invention to identify an appropriate view window based on the overall context of the source document and the location of the identified relevant portion within the source document. For example, embodiments of the present invention provide the ability to identify page breaks, section breaks, paragraph breaks, sentence breaks, signature sections, graphical images, and other general areas in a source document. When a relevant portion is identified in one or more of these logical areas of the source document, the view window can be sized to encapsulate some or all of the logical area in which the relevant portion(s) reside. Thus, the bounds and size of a given view window can vary depending upon the location of the relevant portion in the source document which may depend on the query term(s) supplied.

In accordance with at least some embodiments of the present invention, the view window may have a size that is adapted to capture an area of the source document and the view window location can be determined based on the location of the relevant portion. As an example, if a query term is identified at a particular location (e.g., x-y coordinate or area) on the source document, then the location of the identified query term may be considered a relevant portion of the source document. The view window may be adapted to capture an image beginning a distance before (in the x and y directions) the identified location and a distance after (in the x and y directions) the identified location where these distances are computed such that the view window contains relevant contextual information from the source document in addition to the relevant portion of the document.

In some embodiments, the view window may be constrained to a fixed size (width and height) and only the position (x-y coordinates) of the view window is computed such that the view window contains the region of interest and relevant context.

In some embodiments, the identified relevant portion in the source document may comprise a text portion that is adjacent to a graphical portion or other non-textual portion. In such a situation, the view window may be sized to capture part or all of the text portion as well as some or all of the graphical or signature portion. Accordingly, an image will be provided to the user in the initial search results that depicts the textual portion possibly in the context of the graphics or signature. This can further help the user determine the relevancy of the document while reviewing the initial search results.

In some embodiments, the location and size of the view window may be displayed within the context of the source document by means of a border, a shaded region or other method of visually distinguishing the portions of the source document contained within the view window from those that are not.

The term "computer-readable medium" as used herein refers to any tangible storage and/or transmission medium that participates in providing instructions to a processor for execution. As an alternative to executable instructions, the contents may include data to be processed, such as query parameters. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to search for relevant portions of an image-based source document.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1:
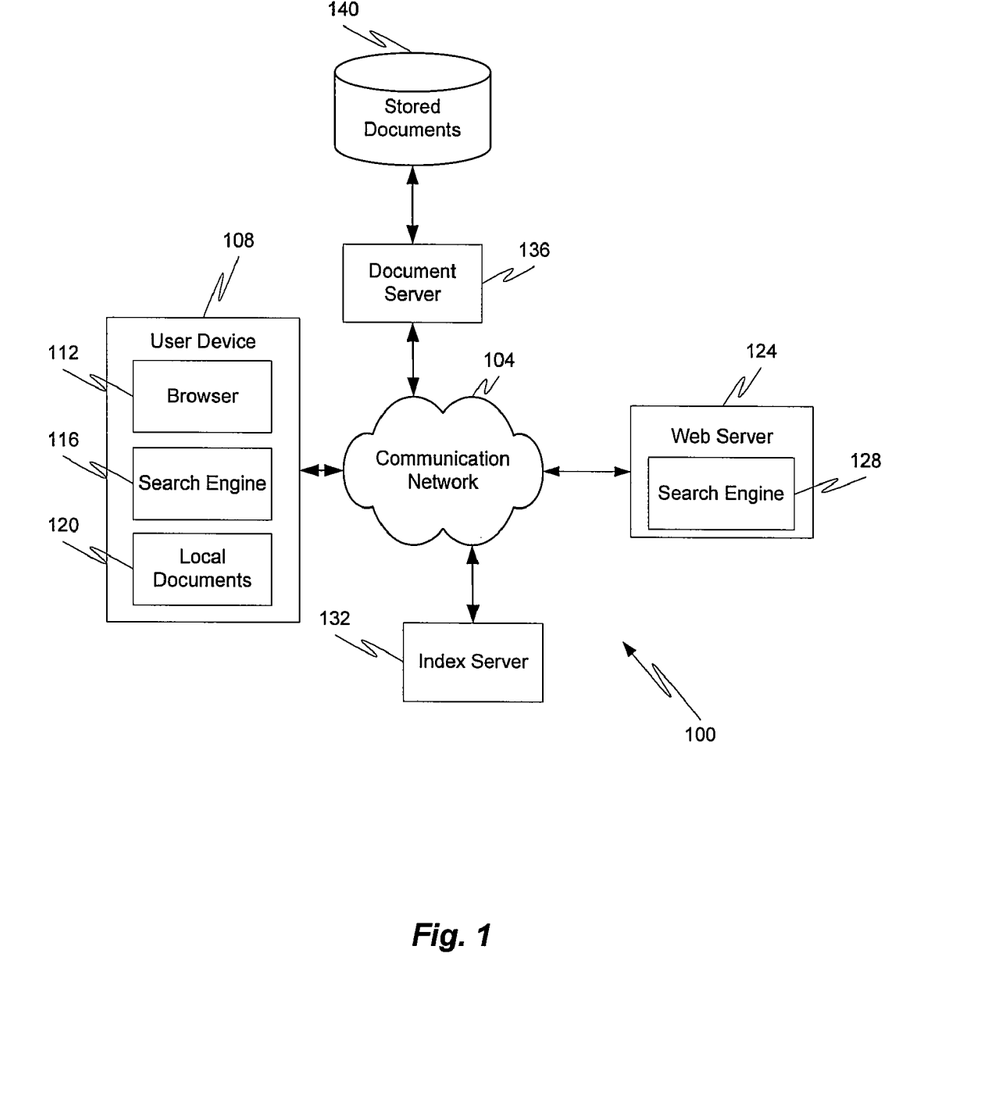
FIG. 1 is a block diagram of a communication system in accordance with embodiments of the present invention.

Referring now to FIG. 1, an exemplary communication system 100 will be described in accordance with at least some embodiments of the present invention. The communication system 100 may comprise a communication network 104 that facilitates communications between one or more communication devices, such as a user device 108, a web server 124, an index server 132, and/or a document server 136.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), an enterprise network, and any other type of packet-switched or circuit-switched network known in the art. In addition, it can be appreciated that the communication network 104 need not be limited to any one network type, and instead may be comprised of a number of different networks and/or network types.

The user device 108 may be any type of known communication or processing device such as a personal computer, laptop, Personal Digital Assistant (PDA), cellular phone, smart phone, telephone, contact center resource, DCP phone, analog phone, or combinations thereof. The user devices 108 may be controlled by or associated with a single user or may be adapted for use by many users (e.g., an enterprise communication device that allows any enterprise user to utilize the communication device upon presentation of a valid user name and password). In general, each user device 108 may be adapted to support video, audio, text, and/or data communications with other user devices 108. The type of medium used by the user device 108 to communicate with other communication devices may depend upon the communication applications available on the user device 108.

In accordance with at least some embodiments of the present invention, the user device 108 may comprise a browser application 112 that enables the user device 108 to interface with a remote search engine 128 on the web server 124. Use of the browser application 112 in combination with the remote search engine 128 allows the user to search for various documents over the communication network 104. As one example, a user may perform a search over the enterprise network to review the various enterprise documents stored in a document management system. These documents may be maintained in a data storage area as stored documents 140. The source documents may be maintained by a document management server 136 that allows a number of enterprise users to store, access, change, etc. their documents on the central data storage area.

In operation, a user enters one or more search parameters (usually keywords) into the browser 112 that has connected with the web server 124 providing search capabilities. The web server 124 sends the query to the index server 132. The content inside the index server 132 is similar to the index in the back of a book—it tells which pages contain the words that match the query. In accordance with at least some embodiments of the present invention, the index server 132 determines the relevance of documents as they relate to the query parameters. More specifically, the search engine 128 in connection with the index server 132 determines the relative importance of each source document containing at least one instance of the query parameter and assigns each source document a relevance ranking. The source documents with the highest relevance ranking will be placed higher in the initial search results (usually organized as a list of one or more search results) that are provided back to the user. The query then travels to the document server 136, which actually retrieve the stored documents 140, or portions thereof. More specifically, the document server 136 is adapted such that it can retrieve, the original source documents, an image of the portion of each source document that has been identified as relevant and a representation of the original source document where the relevant portion is visually distinct from the other parts of the document. As can be appreciated by one skilled in the art, an implementation may not necessarily package up the entire result set (including images) at once, but would rather send on a subset of the result list (e.g., the top 10 results), and the client would then peruse that subset before moving on to another subset.

As an alternative to performing a search with a remote search engine 128, the user device 108 may comprise a local search engine 116 that can be used to search local documents 120 stored on the user device 108. In this configuration, the user is allowed to enter search query parameters in the local search engine 116 and the local search engine 116 is adapted to search the local documents 120 for relevant results. As can be appreciated by one skilled in the art, the local search engine 116 may also be adapted to search all documents in the communication system 100. For example, the local search engine 116 can be used alone or in combination with the remote search engine 128 to search the source documents in the data storage area 140 or on any other user device connected to the communication network.

As can be appreciated by one skilled in the art, any combination of these component pieces may be combined into a single component providing equivalent functionality to the component pieces acting alone.

Figure 2:
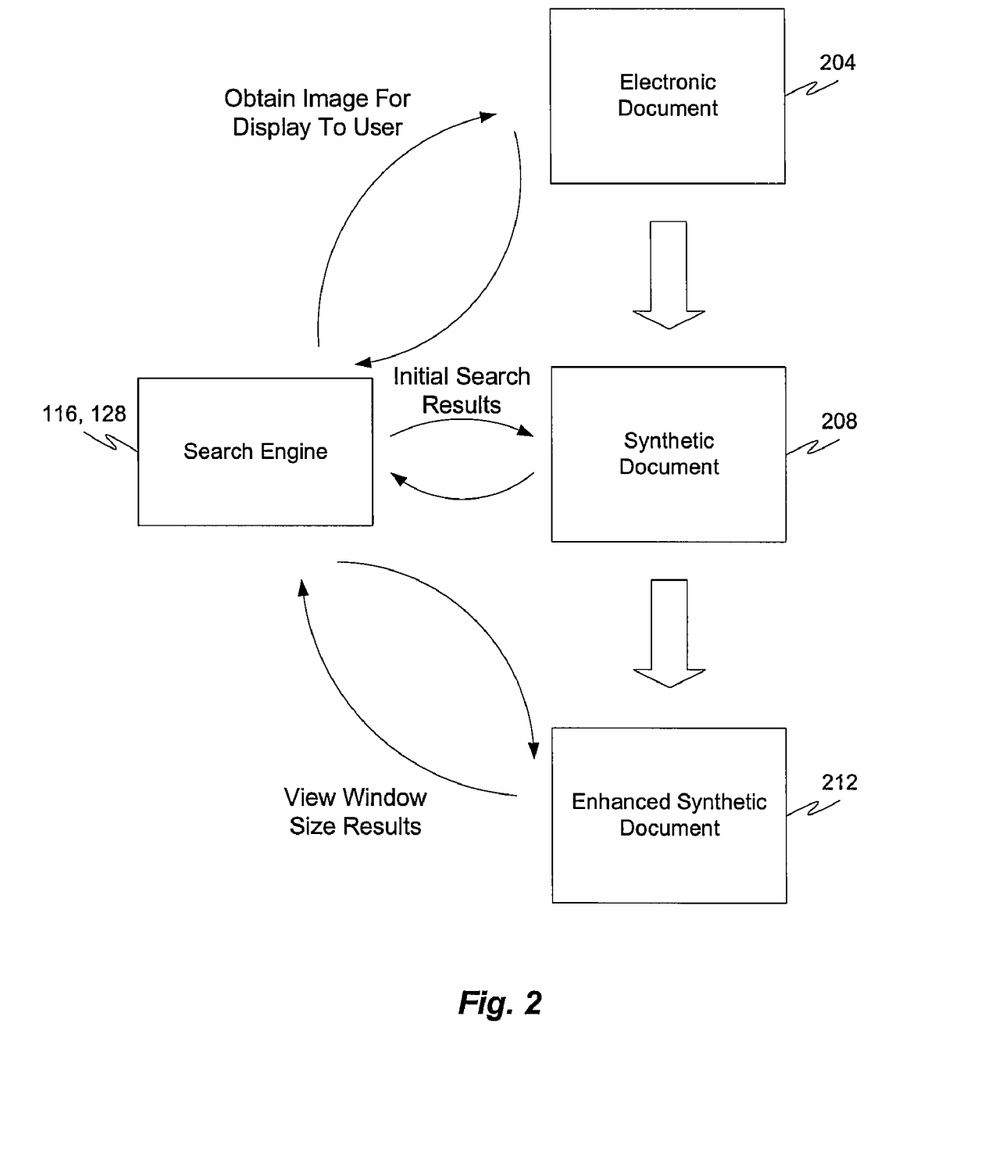
FIG. 2 is a block diagram depicting the operation of a search engine in accordance with embodiments of the present invention.

Referring now to FIG. 2, further details of the operation of the search engine 128 will be described in accordance with at least some embodiments of the present invention. An electronic document 204 is initially stored as an electronic document in a user device 108 and/or in a remote storage area 140. The electronic document 204 may comprise any type of known or yet to be developed image file such as a .jpg (an electronic document where the image consists of a sequence of segments, each beginning with a marker), .pdf (an electronic document containing a combination of vector graphics for illustrations and designs that consists of shapes and lines, text, and raster graphics for photographs and other types of images), .bmp (where image pixels are stored with an assigned color depth per pixel), .gif (a specialized bitmap). The electronic document is, therefore, at least partially a graphical representation of a document, picture, graph, or the like. Additionally, embodiments of the present invention may be used to generate an image representation of a non-image document (e.g., text document, spreadsheet, presentation, etc.). In some embodiments, the electronic document 204 may not actually be an image document per se. For example, presentation techniques of the present invention may be applied to documents in a rich text format (e.g., Microsoft Word and Microsoft Excel documents) or other formats (e.g., HTML or Adobe PDF).

The native form of the electronic document 204 may not be easily searchable by keyword, particularly because the text may be represented indirectly in the form of raster graphics or vector graphics that don't natively correspond to their textual content. In accordance with at least some embodiments of the present invention, the electronic document 204 may be converted to a synthetic document 208 with a conversion process. As one example, an Optical Character Recognition (OCR) or Intelligent Character Recognition (ICR) process may be applied to the original electronic document 204 to convert at least portions thereof into synthetic text. OCR, is the mechanical and/or electronic translation of images of typewritten or printed text (usually captured by a scanner or another digital imaging device such as a digital camera) into machine-editable and machine-searchable text. ICR is a similar process used for handwritten text identification. In some embodiments, the synthetic document 208 contains information in addition to OCR text. For instance, the synthetic document 208 may contain alternate or normalized formats for text. For example, the text string "the $4^{th}$ day of July, 2008" might be normalized to a standardized date format such as Jul. 4, 2008 or multiple standardized formats. Similarly, abbreviations may be standardized ("blvd" changed to "boulevard") to facilitate subsequent searching. Graphical elements, such as notary or recording stamps, logos, lines or boxes, signatures, etc. can also be identified as such in the synthetic document 208. The synthetic document 208 may be more easily searched by the search engine 116, 128 than the electronic document 204.

In accordance with at least some embodiments of the present invention, the synthetic document 208 may be further converted into an enhanced synthetic document 212 where each text character or chunk of text characters (e.g., word, sentence, paragraph, page, section, chapter, etc.) is assigned a relative location in an x-y coordinate system. The assignment of location information (e.g., the mapping of location at a certain document to a particular text character or string) allows the search engine 116, 128 or document server 136 to identify relevant portions of the electronic document 204. The enhanced synthetic document 212 may include information beyond the x-y coordinates. For example, width, height, font, style, and character boundary information may also be incorporated into the synthetic document 212.

Figure 3:
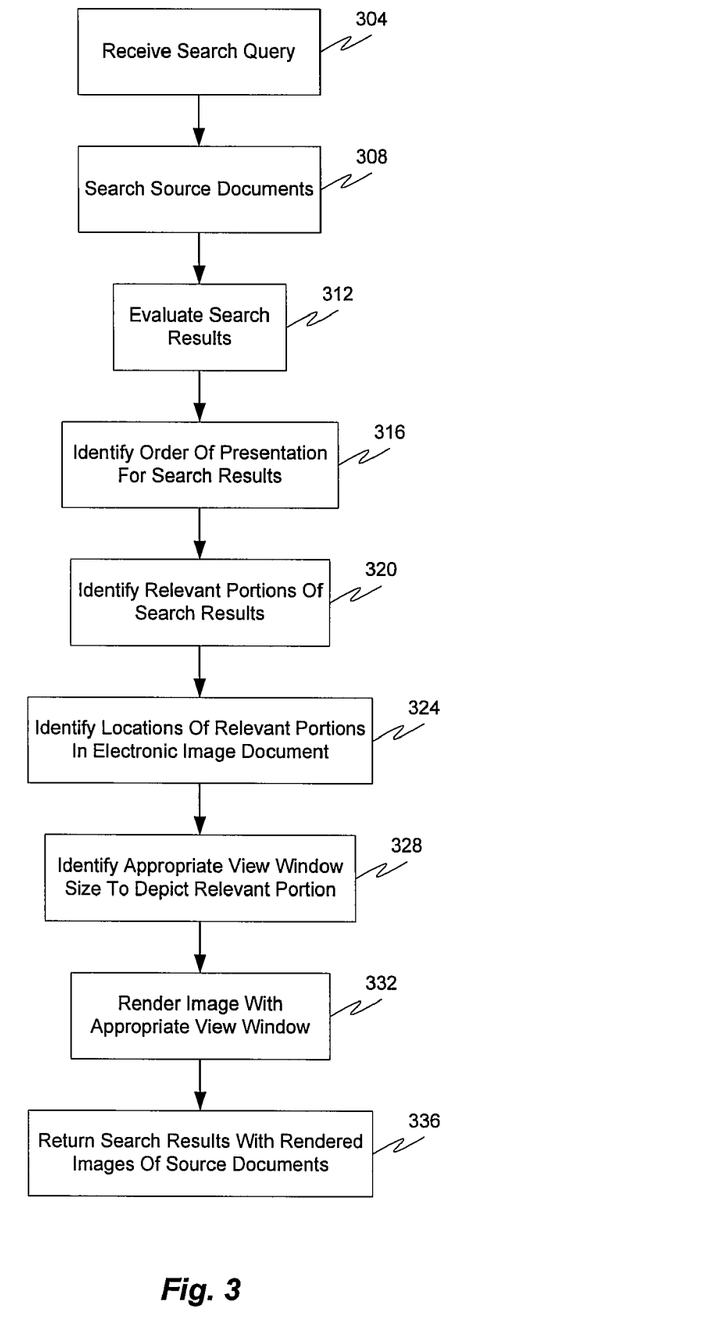
FIG. 3 is a flow diagram depicting a search method in accordance with embodiments of the present invention.

In accordance with at least some embodiments of the present invention, and with reference to FIG. 3, the search engine 116, 128 receives search query parameters (step 304) and with those parameters searches the synthetic document 208 to determine whether the original document 204 has any instances of a search query parameter therein (step 308). This process may alternatively be performed by the index server 132 on a periodic basis and the search engine 116, 128 may simply ask the index server 132 for results on a particular set of query parameters. Also, this search may be performed on the enhanced synthetic document 212 rather than the synthetic document 208.

The search results are then evaluated by the search engine 116, 128 and/or index server 132 (step 312) to determine the relative importance of each source document satisfying the search query parameters (step 316). In other words, the search engine 116, 128 and/or index server 132 determines the order in which the search results will be presented to the user, usually in the form of a list of search results.

It should be noted that a particular search term does not necessarily have to appear verbatim in a particular document 204, 208, 212, for the document to satisfy the search criteria. Rather, an area of interest may be generated by "relevance" to the search term and need not explicitly contain the search term itself. For example, a search of Jul. 4, 2002008 may retrieve a document containing the text string "the 4$^{th}$ day of July, 2008." This may be particularly useful in searching legal and other formalized documents.

In some embodiments, one or more of the documents 204, 208, 212 may also contain metadata associated with and describing the document or contents of the document. The search query may also include a search term for more generic metadata associated with a document and this search term may be utilized for searching in addition to searching actual textual words within a document. For example, the search criteria may limit documents originating from a particular repository even though the document itself may not have text indicating the source.

If it is determined that the document conforms to at least one instance of the search query parameter therein (i.e., the original document 204 or a converted version thereof is identified as a relevant document), then the search engine 116, 128 may determine the location(s) of the relevant portions of the document by analyzing the enhanced synthetic text document where text portions have locations mapped thereto (steps 320 and 324). More specifically, the document is first analyzed to determine if there is a portion therein that is more relevant than other portions. For example, an electronic document may have more than one location that is relevant to the search query parameter. The locations where the number of occurrences is the greatest or is the greatest in concentration may be identified as the most relevant location in that particular document.

The locations may be based on a Cartesian coordinate system, polar coordinate system, or any other type of known coordinate system with an origin at a predetermined location (e.g., top-left corner or middle) on a single page or a new coordinate system beginning on each page and being indexed on a per-page basis. The most relevant portion of the document is identified by location according to the coordinate system assigned to the document. As an example, if the document is written in English and a Cartesian coordinate system is being employed, then the most relevant portion of the source document may be identified in Cartesian coordinates at the upper left corner of the most relevant portion. As another example, if the document is written in Hebrew or Arabic, then the most relevant portion of the source document may be identified by its coordinates at the upper right corner of the most relevant portion. Of course the location may be designated from any one of multiple locations on a given document and embodiments of the present invention are not limited in that respect as can be appreciated by one skilled in the art.

Another aspect of the present invention is to intelligently identify the location and size of the most relevant portion of the source document. In accordance with at least some embodiments of the present invention, the search engine 116, 128 is adapted to analyze the source document to identify section breaks, paragraph breaks, page breaks, inclusions of graphics within text sections, and so on determine whether the most relevant portion begins at a particular section/paragraph/page and/or spans a number of sections/paragraphs/pages or encapsulates graphics as well as text. As one example, the most relevant portion of a source document may comprise two paragraphs having a large concentration of the search query parameter therein and those paragraph may be separated by some sort of graphic (e.g., a graph, picture, chart, or equation). Embodiments of the present invention are adapted to consider both paragraphs and the graphics surrounded thereby as the most relevant portion. As another example, the most relevant portion of a source document may comprise a single section beginning with a particular header or section title. In this example, the section title and the area of that section with the most occurrences of the search query parameter may be considered the most relevant section.

In some embodiments, the location of a relevant portion may be identified as a point location with a direction vector identifying where the relevant portion continues in relationship to the point location. In other embodiments, the location of a relevant portion may be identified as an area location spanning the entire area of the identified relevant portion.

Once the location of the most relevant portion of a source document is found, the search engine 116, 128 is capable of retrieving or reconstituting (i.e., where the document 204, 208, 212, contains actual text along with encoded formatting information, thereby facilitating a reconstitution of the graphics from the embedded coding within the document 204, 208, 212) an image of the most relevant portion of the source document (or multiple relevant portions) by sizing an appropriate view window. More particularly, by knowing the location of a relevant portion, the search engine 116, 128 and/or index server 132 is adapted to identify a view window that substantially depicts the relevant portion to the exclusion of other portions of the source document (step 328). In some embodiments this may comprise analyzing the source document to determine where logical breaks occur in the source document and sizing the view window within the boundaries of such logical breaks. Alternatively, this may comprise using a window of a predetermined size around a point location identified as the beginning of the relevant portion. The window may be sized to cover a predetermined amount of the source document in an attempt to capture as much of the relevant portion as possible without capturing too much information thereby making the image too small for a user to analyze.

The view window is then sized as necessary and an image of the relevant portion of the source document is captured (step 332). In this step the view window is used as the boundaries of the image. In other words, a region to be viewed is identified in the source document and an image of that region is generated. The image is then provided back to the user with the search results (step 336). As can be appreciated by one skilled in the art, the image may be provided in connection with a title of the source document. The title of the source document may include a link, such as a hyperlink link, to the actual source document stored in the data storage area 140. The results may also contain textual data extracted from the document in addition to the image viewport and the title. The image of the relevant portion of the source document can allow the user to determine which source document in the list of source documents provided in the search results are actually desired. The inclusion of an in-context image of the relevant portion of the source document allows the user to quickly identify which source document is desired without actually clicking the link to view the entire source document.

As can be appreciated by one skilled in the art, although three types of documents are depicted in FIG. 2, every original electronic document 204 may be converted to either a synthetic text document 208 or an enhanced synthetic text document 212 and the original electronic document 204 may be discarded. Similarly, a synthetic text document 208 may be converted to an enhanced synthetic text document 212 and the synthetic text document 208 may be discarded in an effort to conserve memory. Accordingly, searches and results may be retrieved from any document depicted in FIG. 2 that has the information necessary to facilitate such a search and provide such results. As an example, images of a source document may be provided to a user from the enhanced synthetic text document 212 rather than the original document 204. Accordingly, the term "source document" as used herein may refer to one or more of the original electronic document 204, the synthetic text document 208, and the enhanced synthetic text document 212. Examples of the various types of source documents that may be searched in accordance with at least some embodiments of the present invention are also described in U.S. Patent Publication No. 2009/0018990 to Moraleda, the entire contents of which are hereby incorporated herein by reference.

Figure 4:
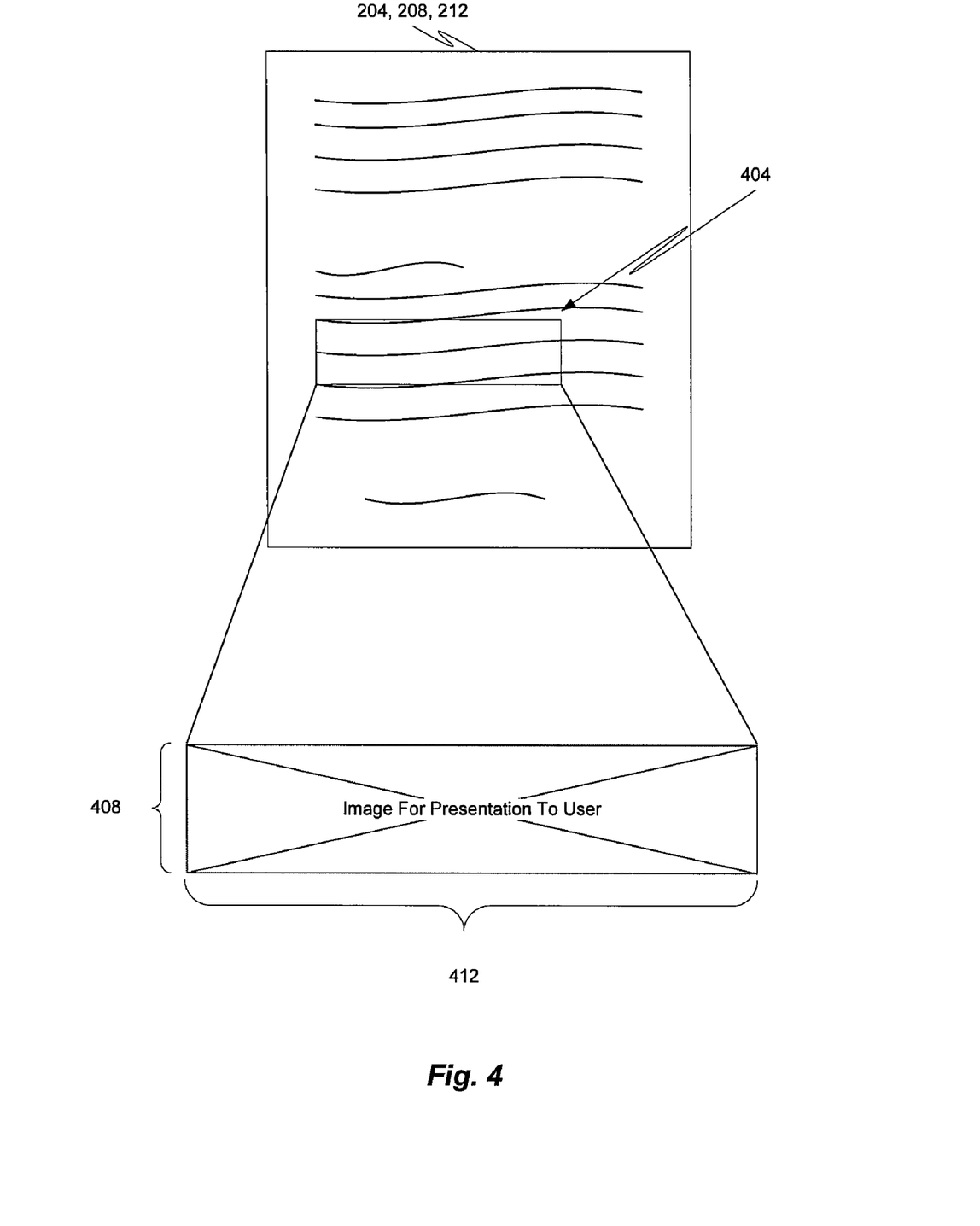
FIG. 4 is a block diagram depicting an exemplary search result image in accordance with embodiments of the present invention.

FIG. 4 shows additional details of a view window 404 used to depict an image of a portion of a source document. The view window 404 may be sized to depict a relevant or the most relevant portion of the source document. In accordance with at least some embodiments of the present invention, the view window 404 may have a height 408 and width 412 that are sufficient to contain the relevant portion of the source document. The image within the view window 404 is the image that is provided back to the user who performed the search query as part of the search results. Accordingly, each source document returned in the search results may comprise an image associated therewith, where the image provided for a source document is smaller in size than an image of the entire source document and preferably contains a relevant portion of the source document.

Additionally, although not depicted, embodiments of the present invention may generate multiple viewports for a single source document. As another alternative, a single viewport may contain content from different parts of a single source document.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for returning search results with an image of a relevant portion of an electronic document. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
  receiving a search query comprising at least one query term;
  identifying a plurality of source documents based on the at least one query term;

identifying a relevant portion of a first source document in the plurality of source documents;

identifying a view window appropriate to depict the relevant portion of the first source document, wherein an image size of the view window is smaller than an image size of the first source document;

rendering a search results image for the relevant portion of the first source document, the search results image having boundaries corresponding to the view window; and rendering the source document in such a way that the portion of the document contained within the view window is visually distinguishable from the remainder of the document; and providing a set of search results, the set of search results including the search results image.

2. The method of claim 1, wherein the view window begins at a first identified logical break in the first source document and ends at a second identified logical break in the first source document, wherein the relevant portion of the first source document is between the first and second logical breaks.

3. The method of claim 2, wherein the first identified logical break comprises at least one of a word, sentence, paragraph, section, graphic, or page.

4. The method of claim 1, wherein the relevant portion of the first source document is identified as a point location in the first source document and wherein the view window is sized to enclose a predetermined area around the point location.

5. The method of claim 4, wherein the relevant portion of the first source document is further identified with a vector originating at the point location directed toward a body of the relevant portion and wherein the view window extends from the point location in the direction of the vector.

6. The method of claim 1, wherein the view window encloses at least a portion of text and at least a portion of non-text.

7. The method of claim 6, wherein the non-text comprises at least one of a graph, signature, chart, embedded image, equation or other non-textual visual element.

8. A computer readable medium comprising processor executable instructions operable to, when executed, perform the method of claim 1.

9. The method of claim 1, wherein the set of search results are ordered according to relevance.

10. A search engine adapted to receive a search parameter from a user in connection with a search query, the search engine being further adapted to search a plurality of source documents for at least one occurrence of the search parameter therein and identify a subset of the plurality of source documents, the subset of source documents having at least one occurrence of the search parameter therein, wherein the search engine is further adapted to assign each source document in the subset of source documents a relative importance and determine an order of presentation of the subset to the user, and wherein the search engine is further adapted to identify a relevant portion of each source document in the subset of source documents and generate an image of the relevant portion of each source document in the subset of source documents and provide the image of the relevant portion along with a link to the source document in a set of search results, wherein the image of the relevant portion is smaller than the entire source document.

11. The search engine of claim 10, wherein the image is presented in a view window which begins at a first identified logical break in the source document and ends at a second identified logical break in the source document, wherein the relevant portion of the source document is between the first and second logical breaks.

12. The search engine of claim 11, wherein the first identified logical break comprises at least one of a word, sentence, paragraph, section, graphic, or page.

13. The search engine of claim 10, wherein the relevant portion of the source document is identified as a point location in the source document and wherein the image is presented in a view window which is sized to enclose a predetermined area around the point location.

14. The search engine of claim 13, wherein the relevant portion of the source document is further identified with a vector originating at the point location directed toward a body of the relevant portion and wherein the view window extends from the point location in the direction of the vector.

15. The search engine of claim 10, wherein the image is presented in a view window which encloses at least a portion of text and at least a portion of non-text.

16. The search engine of claim 15, wherein the non-text comprises at least one of a graph, signature, chart, embedded image, equation or other non-textual visual element.

17. A computer program product comprising computer executable instructions stored onto a computer readable medium which, when executed by a processor of a computer, cause the processor to execute a method, the method comprising:

receiving a search query comprising at least one query term;

identifying a plurality of source documents based on the at least one query term;

identifying a relevant portion of a first source document in the plurality of source documents;

identifying a view window appropriate to depict the relevant portion of the first source document, wherein an image size of the view window is smaller than an image size of the first source document;

rendering a search results image for the relevant portion of the first source document, the search results image having boundaries corresponding to the view window; and providing a set of search results, the set of search results including the search results image.

* * * * *